US012334036B2

(12) United States Patent
Lee et al.

(10) Patent No.: US 12,334,036 B2
(45) Date of Patent: Jun. 17, 2025

(54) APPARATUS AND METHOD FOR CORRECTING IMAGE

(71) Applicant: Samsung Display Co., LTD., Yongin-si (KR)

(72) Inventors: Young Keun Lee, Yongin-si (KR); Min Kyung Kim, Yongin-si (KR); Hyo Sun Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 45 days.

(21) Appl. No.: 17/884,300

(22) Filed: Aug. 9, 2022

(65) Prior Publication Data

US 2023/0154434 A1 May 18, 2023

(30) Foreign Application Priority Data

Nov. 18, 2021 (KR) ........................ 10-2021-0159752

(51) Int. Cl.
*G09G 5/02* (2006.01)
*G06T 11/00* (2006.01)
(Continued)

(52) U.S. Cl.
CPC ....... *G09G 5/06* (2013.01); *G09G 2320/0285* (2013.01); *G09G 2330/12* (2013.01); *G09G 2354/00* (2013.01)

(58) Field of Classification Search
CPC .... G09G 5/02; G09G 5/06; G09G 2320/0285; G09G 2320/0666; G09G 2320/0271;
(Continued)

(56) References Cited

U.S. PATENT DOCUMENTS

H1506 H * 12/1995 Beretta .................... H04N 1/62 345/549
8,830,256 B2 9/2014 Botzas et al.
(Continued)

FOREIGN PATENT DOCUMENTS

CN 103765503 A * 4/2014 .............. G01J 3/506
JP 3870421 B2 * 1/2007 ................ G01J 3/46
(Continued)

OTHER PUBLICATIONS

Digital Camera for use with TV image receiver (Year: 2007).*
(Continued)

*Primary Examiner* — Wesner Sajous
(74) *Attorney, Agent, or Firm* — KILE PARK REED & HOUTTEMAN PLLC

(57) ABSTRACT

An apparatus for correcting an image according to the disclosure includes a color difference detector displaying color difference test images and obtaining color difference recognition information of a user with respect to the color difference test images, a color correction data generator displaying color correction test images based on the color difference recognition information and generating color correction data for correcting color coordinates using the color correction test images, and an image correction data generator generating image correction data for correcting color coordinates for each grayscale of the image displayed by the display device based on the color difference recognition information and the color correction data.

20 Claims, 14 Drawing Sheets

(51) Int. Cl.

| | |
|---|---|
| ***G09G 5/06*** | (2006.01) |
| ***H04N 1/60*** | (2006.01) |
| ***H04N 5/57*** | (2006.01) |
| ***H04N 9/64*** | (2023.01) |

(58) Field of Classification Search

CPC ....... G09G 2320/0276; G09G 2354/00; G09G 2/2003; G09G 2/006; G09G 2360/145; G09G 2320/0693; G01J 3/506; H04N 1/58; H04N 1/60; H04N 1/6058; H04N 1/6019; H04N 1/6027; H04N 5/57–58; H04N 5/86; H04N 9/64–69; H04N 9/73; G06T 11/001; G06T 5/00–08; G06T 2207/10024; G06V 20/10; G06V 30/10

See application file for complete search history.

(56) References Cited

U.S. PATENT DOCUMENTS

| | | | | |
|---|---|---|---|---|
| 9,478,173 | B2 | 10/2016 | Safaee-Rad et al. | |
| 2007/0273939 | A1 | 11/2007 | Kishida et al. | |
| 2012/0263379 | A1* | 10/2012 | Bhatti | G06T 11/001 382/167 |
| 2013/0050504 | A1* | 2/2013 | Safaee-Rad | G09G 5/02 348/181 |
| 2015/0187094 | A1* | 7/2015 | Lee | G06T 5/92 345/590 |
| 2021/0241717 | A1* | 8/2021 | Matsui | G06F 3/1446 |
| 2023/0073331 | A1* | 3/2023 | DeFilippis | G02B 27/141 |
| 2023/0196966 | A1* | 6/2023 | DeFilippis | H04N 9/3164 345/594 |

FOREIGN PATENT DOCUMENTS

| | | | |
|---|---|---|---|
| JP | 2007135032 A | * | 5/2007 |
| JP | 2007-318331 | | 12/2007 |
| KR | 10-1366163 | | 2/2014 |
| KR | 10-1523854 | | 5/2015 |
| KR | 10-1788681 | | 11/2017 |

OTHER PUBLICATIONS

Fast calibration of Displays using spectral-based colorimetry (Year: 2014).*

"Fundamental Chromaticity Diagram With Physiological Axes—Part 1", CIE Technical Report, 2006, 55 total pages, CIE 170-1.

"Fundamental Chromaticity Diagram with Physiological Axes—Part 2: Spectral Luminous Efficiency Functions and Chromaticity Diagrams", CIE Technical Report, 2015, 72 total pages, CIE 170-2.

* cited by examiner $$M \times \begin{bmatrix} X \\ Y \\ Z \end{bmatrix} = \begin{bmatrix} X' \\ Y' \\ Z' \end{bmatrix}$$

CI1: XYZ
CI2: X'Y'Z'

FIG. 7B $$M = \begin{bmatrix} \sigma 11 & \sigma 12 & \sigma 13 \\ \sigma 21 & \sigma 22 & \sigma 23 \\ \sigma 31 & \sigma 32 & \sigma 33 \end{bmatrix}$$

FIG. 8

<LUT>

| | DPW1 | | | | | |
|---|---|---|---|---|---|---|
| DPW2 | | 0nm | 6nm | 12nm | … | m |
| | 0nm | — | M01 | M02 | … | M0j |
| | 3nm | M10 | M11 | M12 | … | M1j |
| | 6nm | M20 | M21 | M22 | … | M2j |
| | … | … | … | … | … | … |
| | n | Mi0 | Mi1 | Mi2 | … | Mij |

<Graph1>

<Graph2>

APPARATUS AND METHOD FOR CORRECTING IMAGE

CROSS-REFERENCE TO RELATED APPLICATION(S)

The application claims priority to and benefits of Korean Patent Application No. 10-2021-0159752 under 35 U.S.C. § 119, filed Nov. 18, 2021 in the Korean Intellectual Property Office (KIPO), the entire contents of which are incorporated herein by reference.

BACKGROUND

1. Technical Field

The disclosure relates to an apparatus and method for correcting an image.

2. Description of the Related Art

In general, a display device may be driven in such a way that a data signal having a voltage corresponding to each grayscale may be generated, and an image may be displayed on a display panel in response to the data signal. Here, the image may be visually recognized differently by a user according to the deviation in a process of manufacturing the display panel, the type of light emitting element included in the display panel, and the like.

For example, even if color coordinates of an image may be set to be the same, due to a metamerism failure phenomenon in which the image may be recognized as a different color by the human eye, the image may be visually recognized differently by the user according to display panels.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

An aspect of the disclosure is to provide an apparatus and method for correcting an image in which a metamerism failure phenomenon (or color difference recognition phenomenon) in which the color of an image may be recognized differently by a user according to a grayscale can be prevented (improved).

An apparatus for correcting an image according to an embodiment of the disclosure may include a color difference detector displaying color difference test images and obtaining color difference recognition information of a user with respect to the color difference test images, a color correction data generator displaying color correction test images based on the color difference recognition information and generating color correction data for correcting color coordinates using the color correction test images, and an image correction data generator generating image correction data for correcting color coordinates for each grayscale of the image displayed by the display device based on the color difference recognition information and the color correction data.

In an embodiment, the color difference test images may have same color coordinates, and the color difference test images may have different peak wavelengths.

In an embodiment, the color difference detector may obtain the color difference recognition information by detecting a critical peak wavelength shift based on a peak wavelength difference of the color difference test images.

In an embodiment, the color difference test images having the peak wavelength difference corresponding to the critical peak wavelength shift may display different colors.

In an embodiment, the color correction test images may include a first color correction test image, and a second color correction test image, and a peak wavelength difference of the first color correction test image and the second color correction test image may be equal to or greater than the critical peak wavelength shift.

In an embodiment, the color correction data generator may detect first color coordinates of the first color correction test image and second color coordinates of the second color correction test image, and the first color coordinates and the second color coordinates may be different from each other.

In an embodiment, the first color correction test image having the first color coordinates and the second color correction test image having the second color coordinates may display a same color.

In an embodiment, the color correction data generator may generate the color correction data by calculating a color correction matrix for converting the first color coordinates into the second color coordinates.

In an embodiment, the color correction matrix may be stored in a form of a look-up table (LUT) in the color correction data.

In an embodiment, the image correction data generator may include a spectrum detector generating spectrum data by detecting an emission spectrum of an image for each grayscale while changing a grayscale of the image displayed by the display device, a peak wavelength detector generating peak wavelength data by detecting a difference between a peak wavelength for each grayscale and a reference peak wavelength based on the spectrum data and the color difference recognition information, and a color converter generating the image correction data for correcting the color coordinates for each grayscale of the image displayed by the display device based on the peak wavelength data and the color correction data.

A method for correcting an image according to an embodiment of the disclosure may include displaying color difference test images and obtaining color difference recognition information of a user with respect to the color difference test images, displaying color correction test images based on the color difference recognition information and generating color correction data for correcting color coordinates using the color correction test images, and generating image correction data for correcting color coordinates for each grayscale of the image displayed by the display device based on the color difference recognition information and the color correction data.

In an embodiment, the color difference test images may have a same color coordinates, and the color difference test images may have different peak wavelengths.

In an embodiment, in the obtaining of the color difference recognition information, the color difference recognition information may be obtained by detecting a critical peak wavelength shift based on a peak wavelength difference of the color difference test images.

In an embodiment, the color difference test images having the peak wavelength difference corresponding to the critical peak wavelength shift may display different colors.

In an embodiment, the color correction test images may include a first color correction test image, and a second color correction test image, and a peak wavelength difference of the first color correction test image and the second color correction test image may be equal to or greater than the critical peak wavelength shift.

In an embodiment, the generating of the color correction data may include detecting first color coordinates of the first color correction test image and second color coordinates of the second color correction test image, and the first color coordinates and the second color coordinates may be different from each other.

In an embodiment, the first color correction test image having the first color coordinates and the second color correction test image having the second color coordinates may display a same color.

In an embodiment, the generating of the color correction data may further include calculating a color correction matrix for converting the first color coordinates into the second color coordinates.

In an embodiment, the color correction matrix may be stored in a form of a look-up table (LUT) in the color correction data.

In an embodiment, the generating of the image correction data may include generating spectrum data by detecting an emission spectrum of an image for each grayscale while changing a grayscale of the image displayed by the display device, generating peak wavelength data by detecting a difference between a peak wavelength for each grayscale and a reference peak wavelength based on the spectrum data and the color difference recognition information, and generating the image correction data for correcting the color coordinates for each grayscale of the image displayed by the display device based on the peak wavelength data and the color correction data.

BRIEF DESCRIPTION OF THE DRAWINGS

The accompanying drawings, which are included to provide a further understanding of inventive concepts, and are incorporated in and constitute a part of this specification, illustrate embodiments of the disclosure, and, together with the description, serve to explain principles of the disclosure.

FIG. 6 is a schematic diagram for explaining an example of an operation in which color coordinates of a color correction test image may be converted by a color correction data generator included in the apparatus for correcting an image of FIG. 1.

FIGS. 7A and 7B are schematic diagrams for explaining an example of an operation of the color correction data generator included in the apparatus for correcting an image of FIG. 1.

FIG. 8 is a schematic diagram illustrating an example of color correction data generated by the color correction data generator included in the apparatus for correcting an image of FIG. 1.

DETAILED DESCRIPTION OF THE EMBODIMENTS

Figure 1:
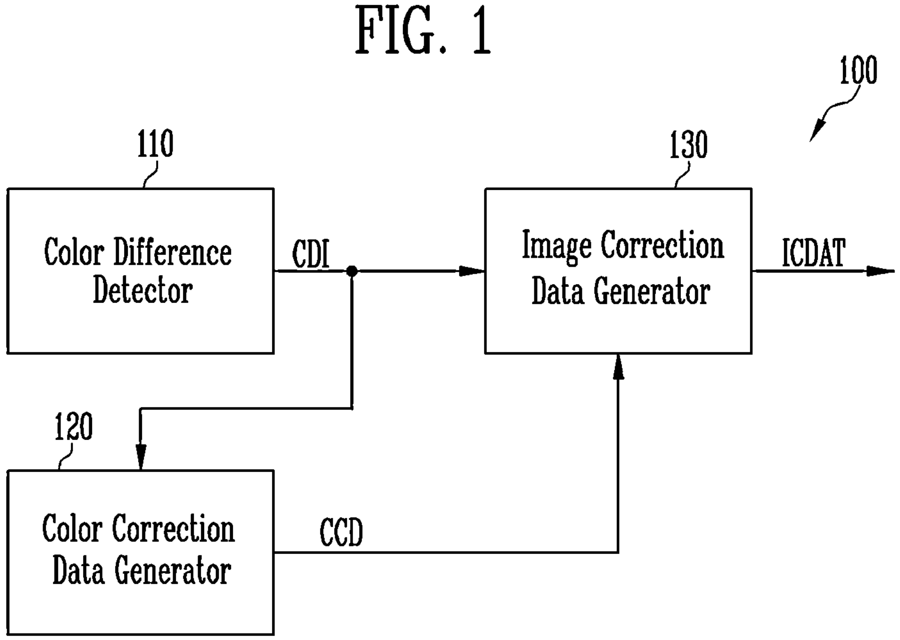
FIG. 1 is a schematic block diagram illustrating an apparatus for correcting an image according to embodiments of the disclosure.

Hereinafter, embodiments of the disclosure will be described in more detail with reference to the accompanying drawings. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

The same reference numerals are used for the same elements in the drawings, and duplicate descriptions for the same elements are omitted.

As used herein, the singular forms, "a," "an," and "the" are intended to include the plural forms as well, unless the context clearly indicates otherwise.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

The terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
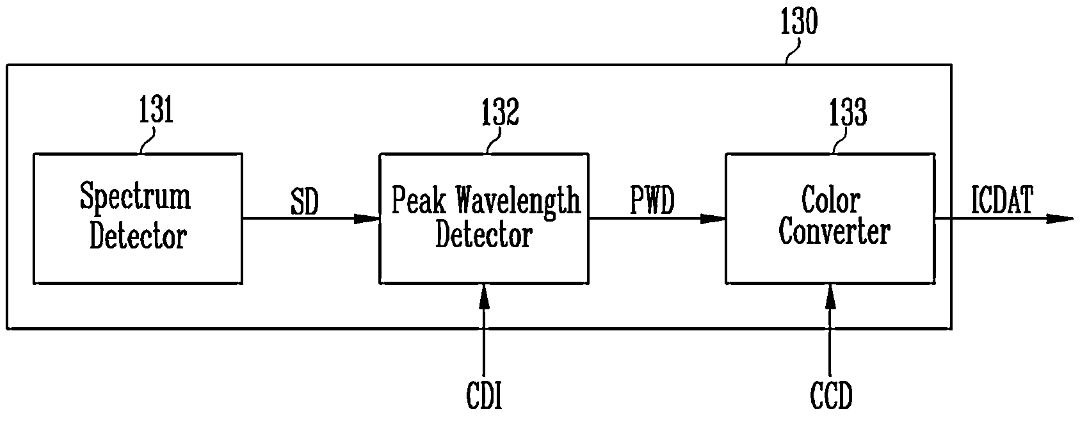
FIG. 2 is a schematic block diagram illustrating an example of an image correction data generator included in the apparatus for correcting an image of FIG. 1.

FIG. 1 is a schematic block diagram illustrating an apparatus for correcting an image according to embodiments of the disclosure. FIG. 2 is a schematic block diagram illustrating an example of an image correction data generator included in the apparatus for correcting an image of FIG. 1.

Figure 12:
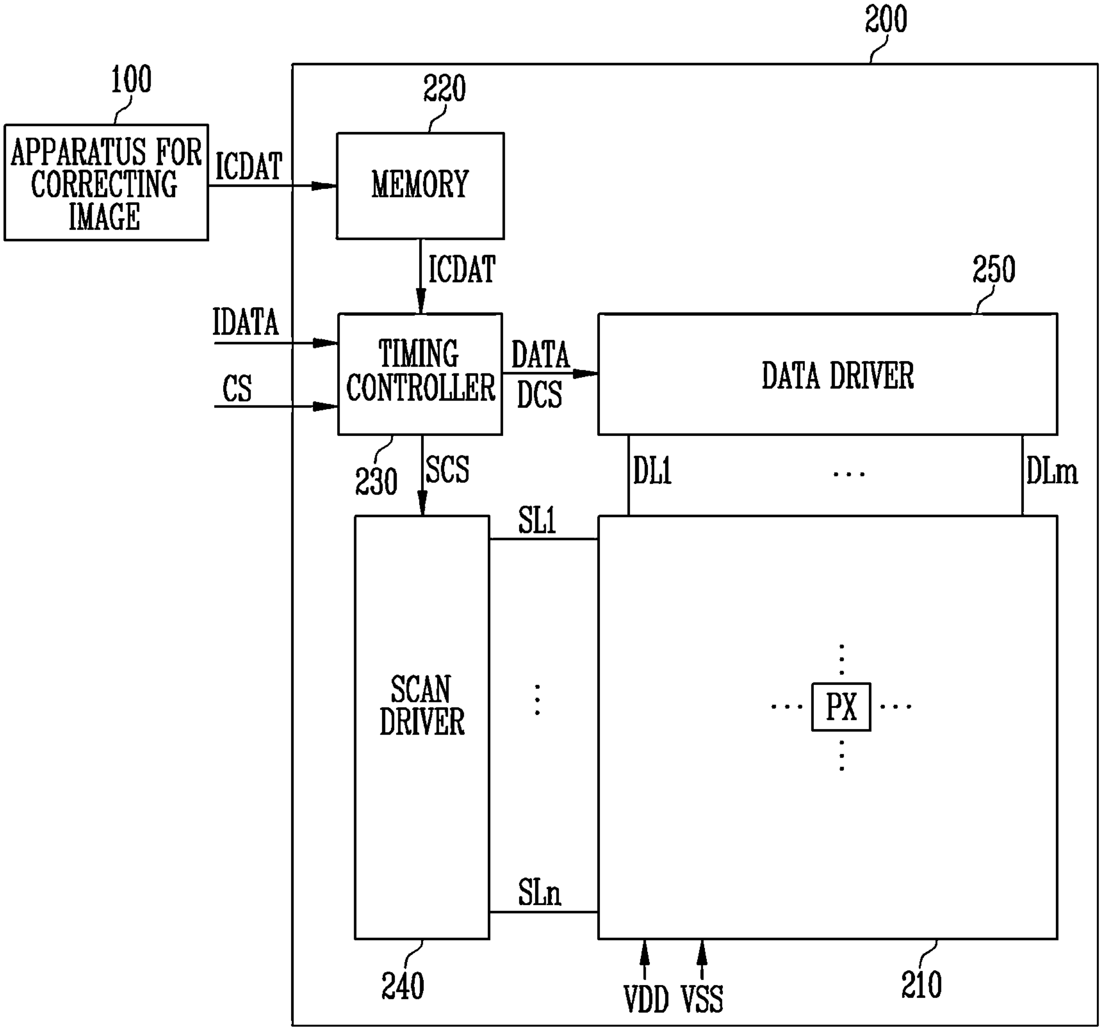
FIG. 12 is a schematic block diagram illustrating an image correction system including a display device and an apparatus for correcting an image according to embodiments of the disclosure.

An apparatus 100 for correcting an image according to embodiments of the disclosure may correct an image displayed by a display device (for example, a display device 200 of FIG. 12).

Specifically, an image may be visually recognized differently by a user according to the deviation in a process of manufacturing a display panel (for example, a display panel 210 of FIG. 12) included in the display device (for example, the display device 200 of FIG. 12), the type of light emitting element of a pixel (for example, a pixel PX of FIG. 12) included in the display panel (for example, the display panel 210 of FIG. 12), and the like.

For example, light generated by a light emitting element may be a kind of electromagnetic wave and may have a wavelength in a range of about 380 nm to about 780 nm, and the color of the light visually recognized by a user may vary depending on the wavelength. Humans can distinguish colors according to the degree to which light may be absorbed by photoreceptor cells (cone cells) of the human eye. The photoreceptor cells that absorb light can be divided into three types, each of which can respond to a different wavelength region. Here, even if two lights have different wavelength distributions, the human eye can regard the two lights to be absorbed by the same amount under certain conditions. For example, two lights having different wavelength distributions may be recognized by the human as the same color. Such a phenomenon can be referred to as a metamerism phenomenon. Color coordinates may be numerical representations of colors according to the metamerism phenomenon. For example, the color coordinates may be CIE 1931 color coordinates and the like according to regulations of the Commission International de l'Eclairage (CIE).

However, according to the type of light emitting element, in a case of a wide gamut display device with spectral characteristics of a narrow bandwidth, even if the color coordinates may be set to be the same, a metamerism failure phenomenon (or color difference recognition phenomenon) in which colors may be recognized differently by the user's eyes may occur. For example, a display device may display an image of a corresponding grayscale by controlling the amount (or current density) of driving current applied to the light emitting element according to the grayscale. Here, depending on the amount (or current density) of driving current applied to the light emitting element, a peak wavelength shift phenomenon may occur in the emission spectrum of light generated by the light emitting element. According to such a peak wavelength shift, the metamerism failure phenomenon may occur.

In order to improve this phenomenon, the apparatus 100 for correcting an image according to embodiments of the disclosure may detect a critical peak wavelength shift in which colors of two images having the same color coordinates may be recognized differently by the user, generate color correction data for correcting the color coordinates so that the colors of the two images may be recognized as the same by the user with respect to the two images having a peak wavelength difference equal to or greater than the critical peak wavelength shift, detect the shift amount of a peak wavelength for each grayscale through the emission spectrum of the display panel of the display device to be corrected, and generate image correction data for correcting the image of the display device based on the detected shift amount of the peak wavelength for each grayscale and the color correction data.

Referring to FIG. 1 to describe the disclosure in more detail, the apparatus 100 for correcting an image according to embodiments of the disclosure may include a color difference detector 110, a color correction data generator 120, and an image correction data generator 130.

The color difference detector 110 may display a color difference test image on a display panel to be tested, and obtain color difference recognition information CDI of a user with respect to the color difference test image.

The color difference detector 110 may display two color difference test images (for example, a first color difference test image and a second color difference test image) having the same color coordinates on two display panels to be tested, respectively, and allow the user to compare and observe them.

According to some embodiments, the color difference detector 110 may allow the user to compare and observe the color difference test images while changing a peak wavelength of one of the two color difference test images. For example, the color difference detector 110 may be implemented as a spectrum emulator to change the peak wavelength of one of the two color difference test images. The color difference detector 110 may obtain information on a critical peak wavelength shift corresponding to a point at which the user recognizes that the two color difference test images display different colors (for example, the user recognizes the color difference), and obtain color difference recognition information (CDI) based thereon.

The image displayed by the display device may have three peak wavelengths in the emission spectrum. For example, in the emission spectrum of the image, within a wavelength range between 380 nm and 780 nm, a first peak wavelength (for example, a blue peak wavelength) that occurs near about 450 nm, a second peak wavelength (for example, a green peak wavelength) that occurs near about 530 nm, and a third peak wavelength (for example, a red peak wavelength) that occurs near about 640 nm may occur.

Here, in order to detect whether the user can recognize the color difference with respect to each peak wavelength, the color difference detector 110 may change the peak wavelength of the color difference test image, and allow the user to compare and observe the color difference test image while changing three peak wavelengths (for example, the green peak wavelength, the blue peak wavelength, and the red peak wavelength) of the color difference test image one by one. For example, the color difference detector 110 may obtain information on the critical peak wavelength shift (for example, a first critical peak wavelength shift) with respect to the green peak wavelength by allowing the user to compare and observe while changing only the green peak wavelength among the three peak wavelengths. The color difference detector 110 may obtain information on the critical peak wavelength shift (for example, a second critical peak wavelength shift) with respect to the blue peak wavelength by allowing the user to compare and observe while changing only the blue peak wavelength among the three peak wavelengths.

In a case of the red peak wavelength among the three peak wavelengths, even if red peak wavelengths of the two color difference test images may be changed, the user may not recognize the color difference between the two color difference test images. In the photoreceptor cells (cone cells) of the human eye, there may be three receptors for receiving light of short wavelength, medium wavelength, and long wavelength, respectively. In case that the peak wavelength of the short wavelength corresponding to blue and/or the medium wavelength corresponding to green is changed, the user may recognize this as the color difference. On the other hand, even if the peak wavelength of the long wavelength corresponding to red is changed, the user may not recognize the color difference due to the human visual recognition ability.

For example, in case that the color difference detector 110 allows the user to compare and observe while changing only the red peak wavelength among the peak wavelengths, it can be confirmed that the user may not recognize the color difference.

In order to check whether the user can recognize the color difference according to the peak wavelength shift, in the display panels to be tested for displaying the color difference test image, characteristics other than the peak wavelength shift need to be the same. Accordingly, the two display panels to be tested may be display panels manufactured through the same manufacturing process.

A detailed operation of the color difference detector 110 will be described in detail with reference to FIGS. 3 and 4A to 4D.

The color correction data generator 120 may receive the color difference recognition information CDI from the color difference detector 110 and generate color correction data CCD based on the color difference recognition information CDI.

According to some embodiments, the color correction data generator 120 may display two color correction test images (for example, a first color correction test image and a second color correction test image) having a peak wavelength difference equal to or greater than a critical peak wavelength shift on two display panels to be tested, and allow the user to compare and observe the color correction test images while fixing the color coordinates (for example, first color coordinates) of one (for example, the first color correction test image) of the two color correction test images and changing the color coordinates (for example, second color coordinates) of the other one (for example, the second color correction test image) of the two color correction test images.

For example, the color correction data generator 120 may set the two color correction test images to have the peak wavelength difference as much as the critical peak wavelength shift, and allow the user to compare and observe the correction test images while changing the color coordinates of one of the two color correction test images. The color correction data generator 120 may obtain information on color coordinates that can be recognized by the user as the two color correction test images displaying the same color.

As described above, the color difference recognition information CDI generated by the color difference detector 110 may include information on the critical peak wavelength shift for each of the peak wavelengths. Therefore, in setting the peak wavelength difference of the two color correction test images, with respect to a peak wavelength (for example, the blue peak wavelength, the green peak wavelength, and the red peak wavelength), the color correction data generator 120 may set the color correction test images to have the peak wavelength difference corresponding to the critical peak wavelength shift.

For example, the color correction data generator 120 may set a green peak wavelength difference of the two color correction test images to correspond to the critical peak wavelength shift (for example, the first critical peak wavelength shift with respect to the green peak wavelength). Accordingly, with respect to the two color correction test images having the green peak wavelength difference as much as the critical peak wavelength shift, the color correction data generator 120 may obtain information on the color coordinates that can be recognized by the user as two color correction test images displaying the same color.

The color correction data generator 120 may set a blue peak wavelength difference of the two color correction test images to correspond to the critical peak wavelength shift (for example, the second critical peak wavelength shift with respect to the blue peak wavelength). Accordingly, with respect to the two color correction test images having the blue peak wavelength difference as much as the critical peak wavelength shift, the color correction data generator 120 may obtain the information on color coordinates that can be recognized by the user as two color correction test images displaying the same color.

As described above, since the user may not recognize the color difference with respect to a change in the red peak wavelength among the peak wavelengths, the color correction data generator 120 may not compare and observe the red peak wavelength.

The color correction data generator 120 may allow the user to compare and observe the color correction test images while setting the peak wavelength difference of the two color correction test images to be greater than the critical peak wavelength shift.

For example, the color correction data generator 120 may set the green peak wavelength difference of the two color correction test images as a multiple of the critical peak wavelength shift (for example, the first critical peak wavelength shift).

As another example, the color correction data generator 120 may set the blue peak wavelength difference of the two color correction test images as a multiple of the critical peak wavelength shift (for example, the second critical peak wavelength shift).

For example, the color correction data generator 120 may allow the user to compare and observe the color correction test images while setting the peak wavelength difference of the two color correction test images to be greater than or equal to the critical peak wavelength shift.

In the image displayed by the display device, a peak wavelength may be shifted according to the amount (or current density) of the driving current applied to the light emitting element, but two or more peak wavelengths may be shifted.

Accordingly, in setting the peak wavelength difference of the two color correction test images, the color correction data generator 120 may allow the user to compare and observe the color correction test images while setting not only one peak wavelength but also two or more peak wavelengths to be greater than or equal to the critical peak wavelength shift.

In this way, the color correction data generator 120 may set the peak wavelength difference of the two color correction test images to be greater than or equal to the critical peak wavelength shift. In setting each peak wavelength difference, the color correction data generator 120 may allow the user to compare and observe the color correction test images while fixing the color coordinates of one of the two color correction test images and changing the color coordinates of the other one of the two color correction test images, and obtain the information on the color coordinates that can be recognized by the user as the two color correction test images displaying the same color.

In an embodiment, the color correction data generator 120 may generate the color correction data CCD for correcting the color coordinates based on the information on the color coordinates so that colors of the two color correction test images having the peak wavelength difference greater than or equal to the critical peak wavelength shift may be recognized by the user as the same color.

For example, the color correction data generator 120 may generate the color correction data CCD for converting the color coordinates (for example, the first color coordinates) of the color correction test image in which the color coordinates may be fixed into the color coordinates (for example, the second color coordinates) of the color correction test image in which the color coordinates may be changed using the information on the color coordinates of each of the color correction test images in which the two color correction test images having the peak wavelength difference equal to or greater than the critical peak wavelength shift can be recognized by the user as the same color.

A detailed operation of the color correction data generator 120 will be described in detail with reference to FIGS. 5 to 8.

The image correction data generator 130 may generate image correction data ICDAT for correcting the image displayed by the display device (for example, the display device 200 of FIG. 12) based on the color difference recognition information CDI and the color correction data CCD.

In an embodiment, the image correction data generator 130 may generate the image correction data ICDAT for correcting the color coordinates for each grayscale of the image displayed by the display device (for example, the display device 200 of FIG. 12).

Referring further to FIG. 2 to describe the disclosure in more detail, the image correction data generator 130 may include a spectrum detector 131, a peak wavelength detector 132, and a color converter 133.

The spectrum detector 131 may generate spectrum data SD by detecting the emission spectrum of the image displayed by the display device. For example, the spectrum detector 131 may be an optical spectrum analyzer that measures the intensity of light for each wavelength of the image displayed by the display device.

In an embodiment, the spectrum detector 131 may detect the emission spectrum of the image for each grayscale while changing the grayscale of the image displayed by the display device. For example, the spectrum detector 131 may detect the emission spectrum of each grayscale while changing the grayscale of the image in a grayscale unit from the lowest grayscale (for example, 0 grayscale) to the highest grayscale (for example, 255 grayscale). Here, the grayscale unit may be set as one grayscale unit, but this is only an example, and the disclosure is not limited thereto. The grayscale unit may be set as two grayscale units or the like.

The peak wavelength detector 132 may receive the spectrum data SD from the spectrum detector 131 and receive the color difference recognition information CDI from the color difference detector 110. The peak wavelength detector 132 may generate peak wavelength data PWD by detecting a difference between a peak wavelength on the emission spectrum for each grayscale and a reference peak wavelength based on the spectrum data SD and the color difference recognition information CDI.

For example, the peak wavelength detector 132 may set the emission spectrum corresponding to the highest grayscale (for example, 255 grayscale) among spectra measured for each grayscale as a reference spectrum, and generate the peak wavelength data PWD by comparing the reference peak wavelength on the reference spectrum with peak wavelengths of emission spectra corresponding to the remaining grayscales, respectively. However, embodiments of the disclosure are not limited thereto. The peak wavelength detector 132 may set the emission spectrum corresponding to the lowest grayscale (for example, 0 grayscale) among the spectra measured for each grayscale as the reference spectrum.

The color converter 133 may receive the peak wavelength data PWD from the peak wavelength detector 132 and receive the color correction data CCD from the color correction data generator 120. The color converter 133 may detect the peak wavelength difference of a specific grayscale using the peak wavelength data PWD, and generate the image correction data ICDAT for converting the color coordinates of a corresponding grayscale image based on the color correction data CCD.

Here, as described with reference to FIG. 1, the color correction data CCD may be based on the information on the color coordinates in which two images having a specific peak wavelength difference may be recognized by the user as the same. Therefore, in case that the color coordinates of images displayed by the display device are converted (or corrected) by the image correction data ICDAT generated by the color converter 133, except for a difference in brightness according to a grayscale, the user may recognize that the images for each grayscale express the same color.

As described above, the apparatus 100 for correcting an image according to embodiments of the disclosure may correct the color coordinates of an image to be displayed according to the cognitive ability of a user (observer). Therefore, the metamerism failure phenomenon (or the color difference recognition phenomenon) in which the color of an image may be recognized differently by a user according to a grayscale can be prevented (or improved).

Hereinafter, an operation of the apparatus 100 for correcting an image according to embodiments of the disclosure will be described in more detail with reference to FIGS. 3 to 10B.

Figure 3:
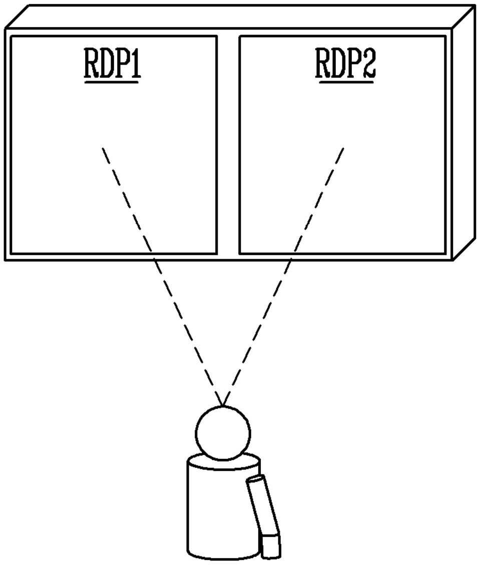
FIG. 3 is a schematic diagram illustrating an example in which an observer compares and observes two test images.
Figure 5:
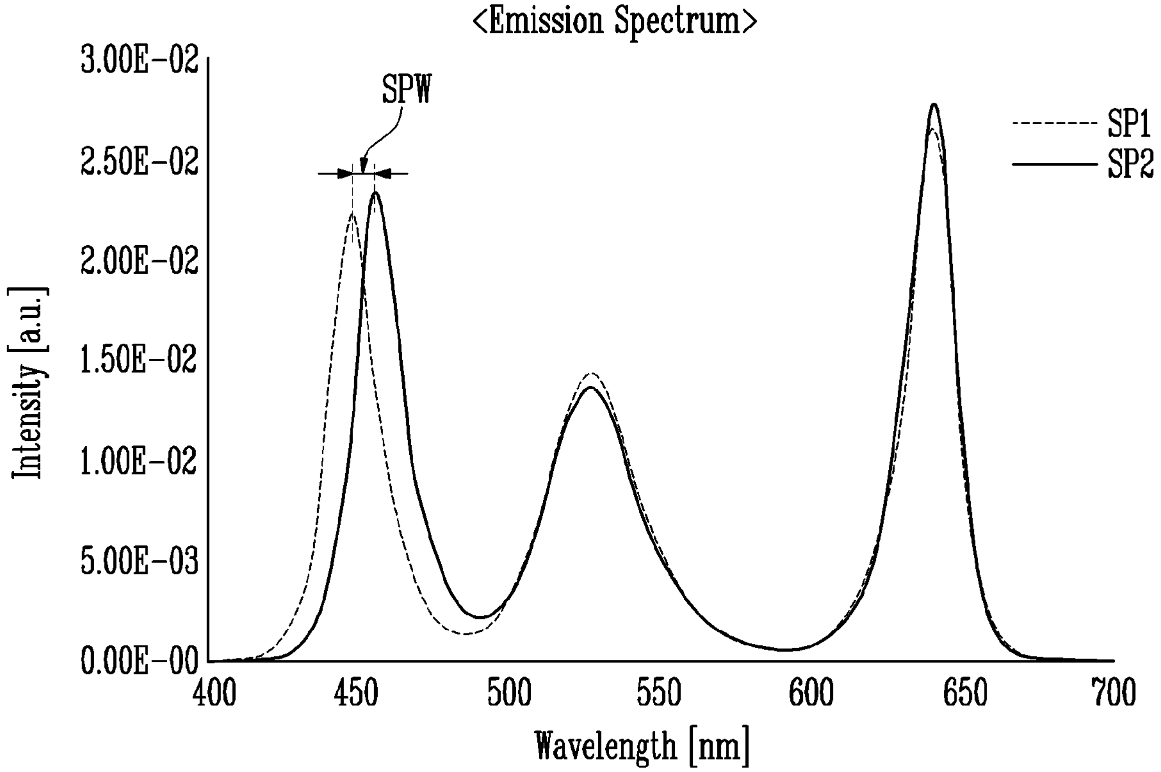
FIG. 5 is a schematic diagram for explaining a peak wavelength difference of color correction test images.
Figures 6, 7A:
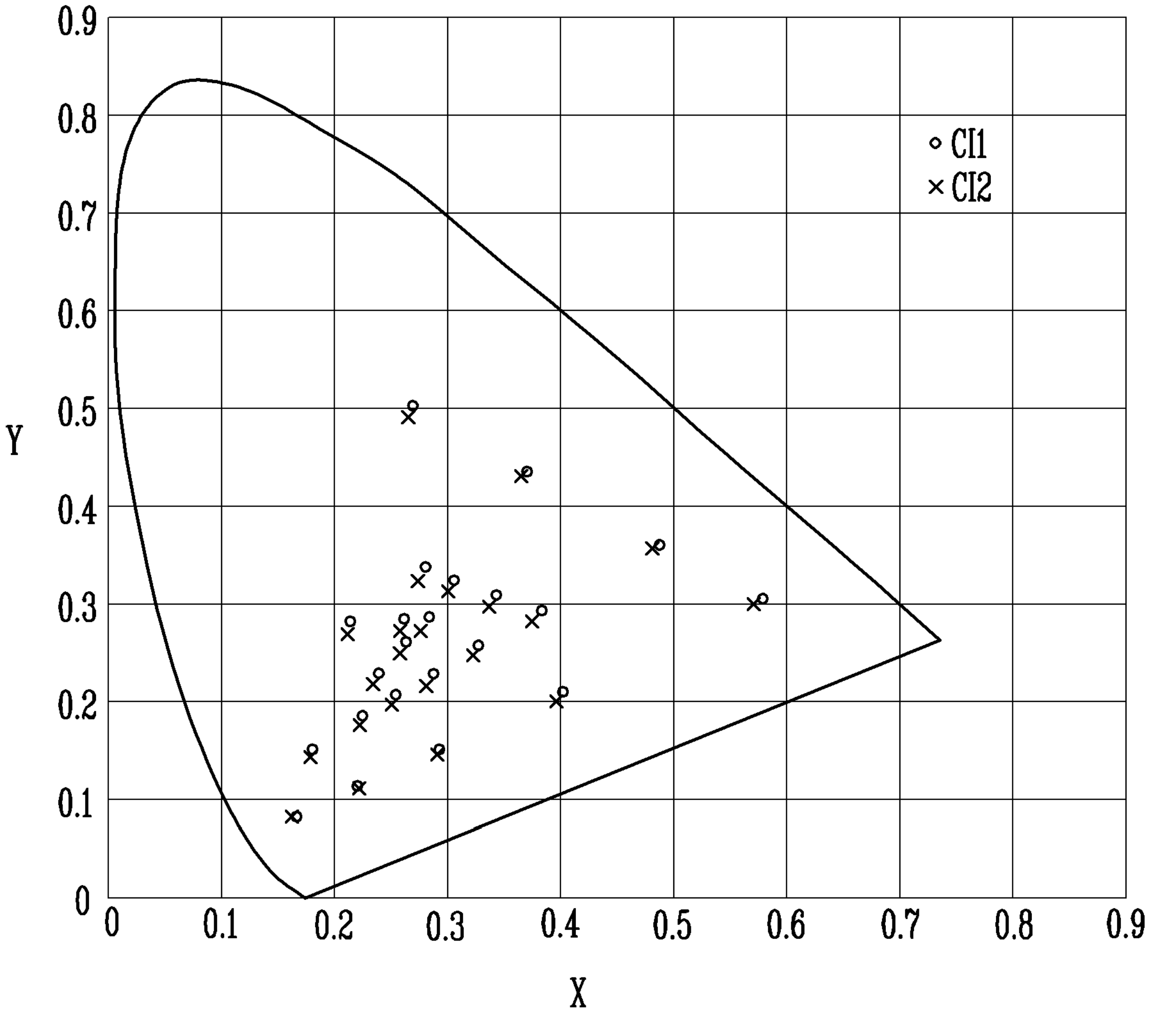
Figure 9A:
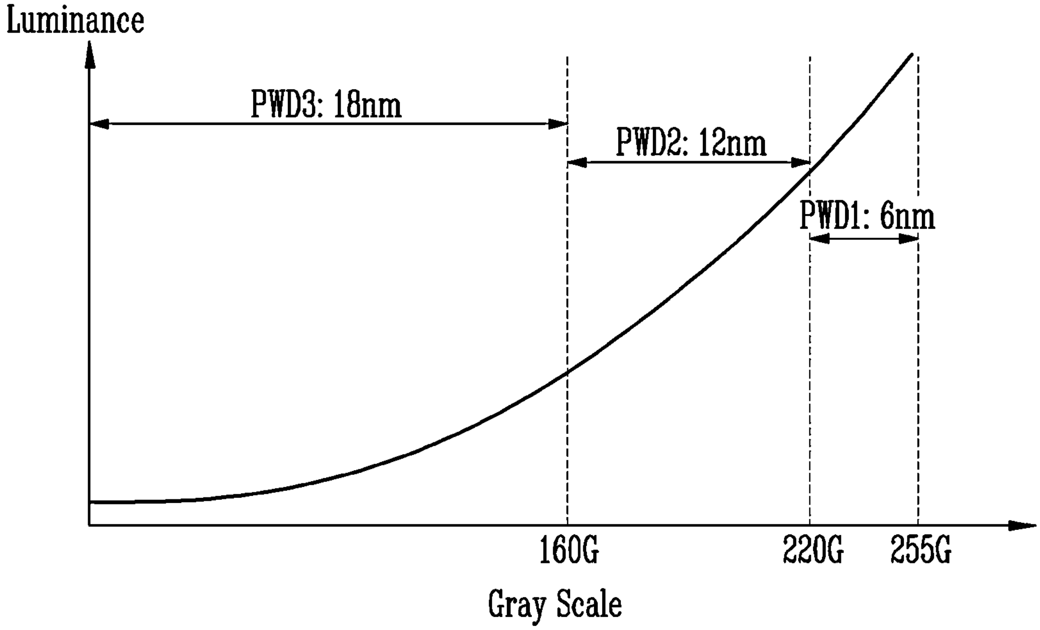
FIGS. 9A and 9B are schematic diagrams for explaining an example of an operation of a peak wavelength detector included in the image correction data generator of FIG. 2.
Figure 9B:
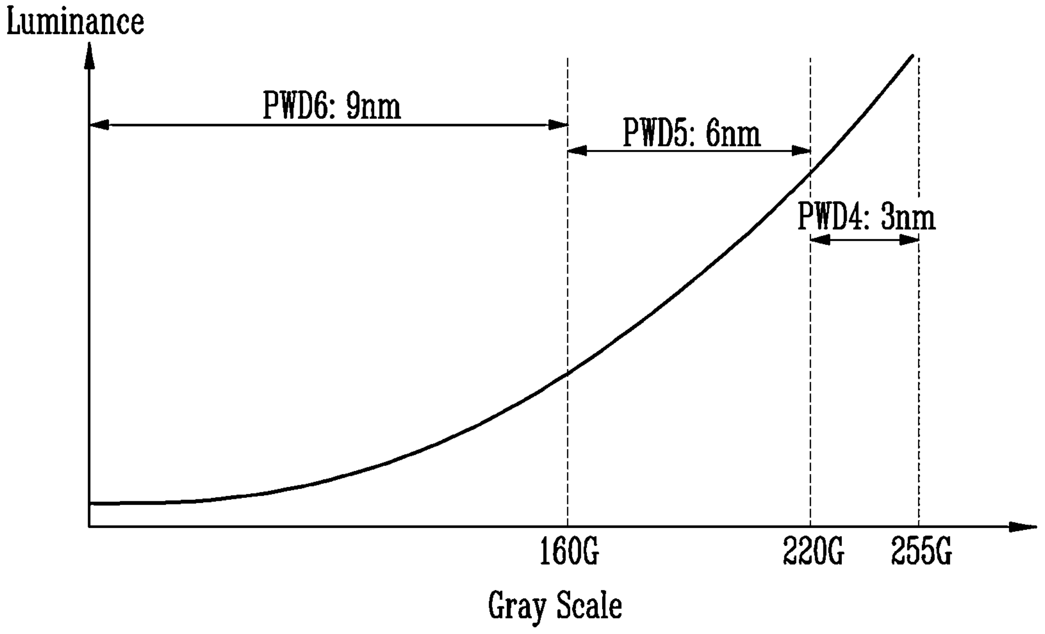
Figure 10A:
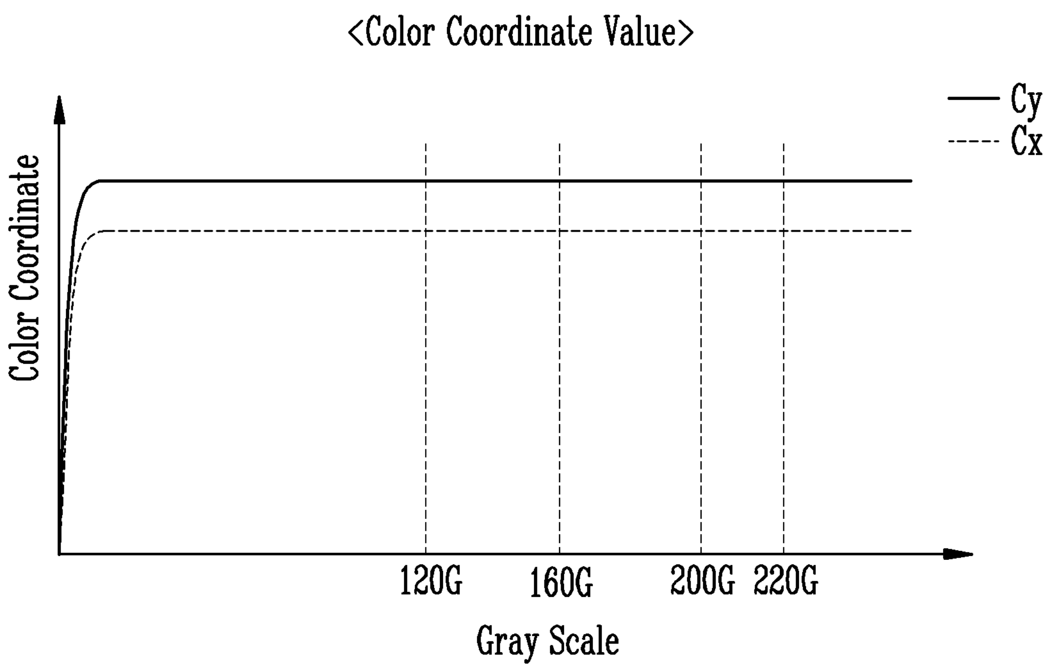
FIGS. 10A and 10B are schematic diagrams for explaining an example of color coordinates of an image corrected by the apparatus for correcting an image according to embodiments of the disclosure.
Figure 10B:
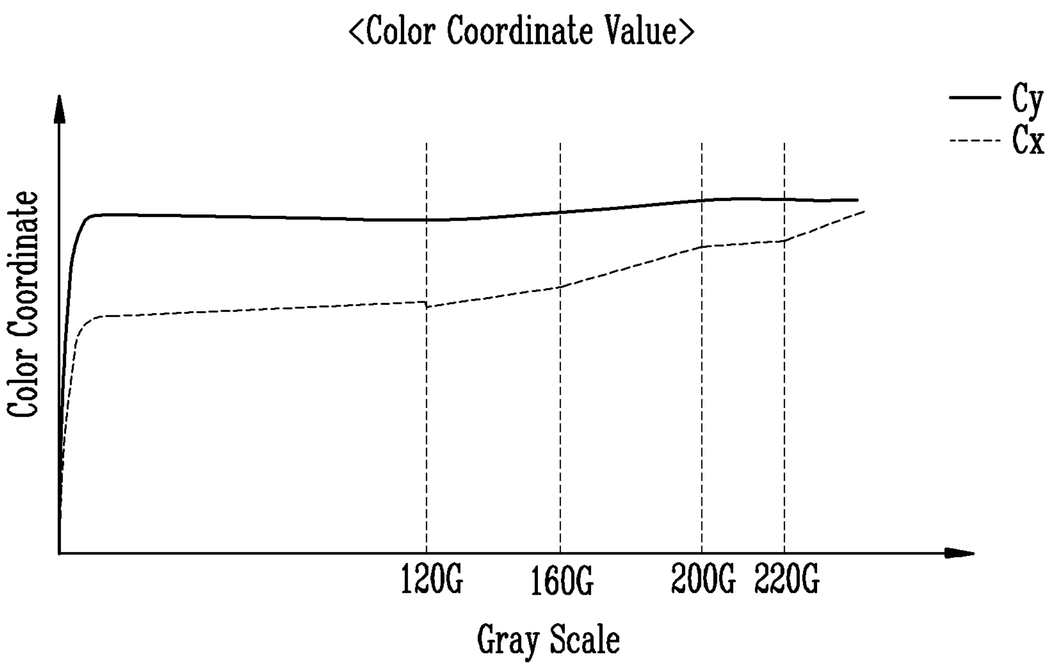

FIG. 3 is a schematic diagram illustrating an example in which an observer compares and observes two test images. FIGS. 4A to 4D are schematic diagrams for explaining an example of an operation of a color difference detector included in the apparatus for correcting an image of FIG. 1. FIG. 5 is a schematic diagram for explaining a peak wavelength difference of color correction test images. FIG. 6 is a schematic diagram for explaining an example of an operation in which color coordinates of a color correction test image may be converted by a color correction data generator included in the apparatus for correcting an image of FIG. 1. FIGS. 7A and 7B are schematic diagrams for explaining an example of an operation of the color correction data generator included in the apparatus for correcting an image of FIG. 1. FIG. 8 is a schematic diagram illustrating an example of color correction data generated by the color correction data generator included in the apparatus for correcting an image of FIG. 1. FIGS. 9A and 9B are schematic diagrams for explaining an example of an operation of a peak wavelength detector included in the image correction data generator of FIG. 2. FIGS. 10A and 10B are schematic diagrams for explaining an example of color coordinates of an image corrected by the apparatus for correcting an image according to embodiments of the disclosure.

FIG. 3 shows an embodiment in which a user compares and observes two test images through two reference display panels RDP1 and RDP2. As described with reference to FIGS. 1 and 2, the color difference detector 110 and the color correction data generator 120 included in the apparatus 100 for correcting an image may generate the color difference recognition information CDI and color correction data CCD by allowing the user to compare and observe two test images (for example, two color difference test images or two color correction test images), respectively. The color difference detector 110 and the color correction data generator 120 may display two test images through the two reference display panels RDP1 and RDP2 shown in FIG. 3, respectively.

In FIG. 3, the user who compares and observes the two test images may be a standard observer. This may be to prevent the compared and observed results from being different depending on users in case that the apparatus 100 for correcting an image generates the image correction data ICDAT for correcting the image of the display device. For example, the standard observer may be a CIE standard observer. Embodiments of the disclosure are not limited thereto, and a standard of the standard observer may be set in various ways.

Figure 4A:
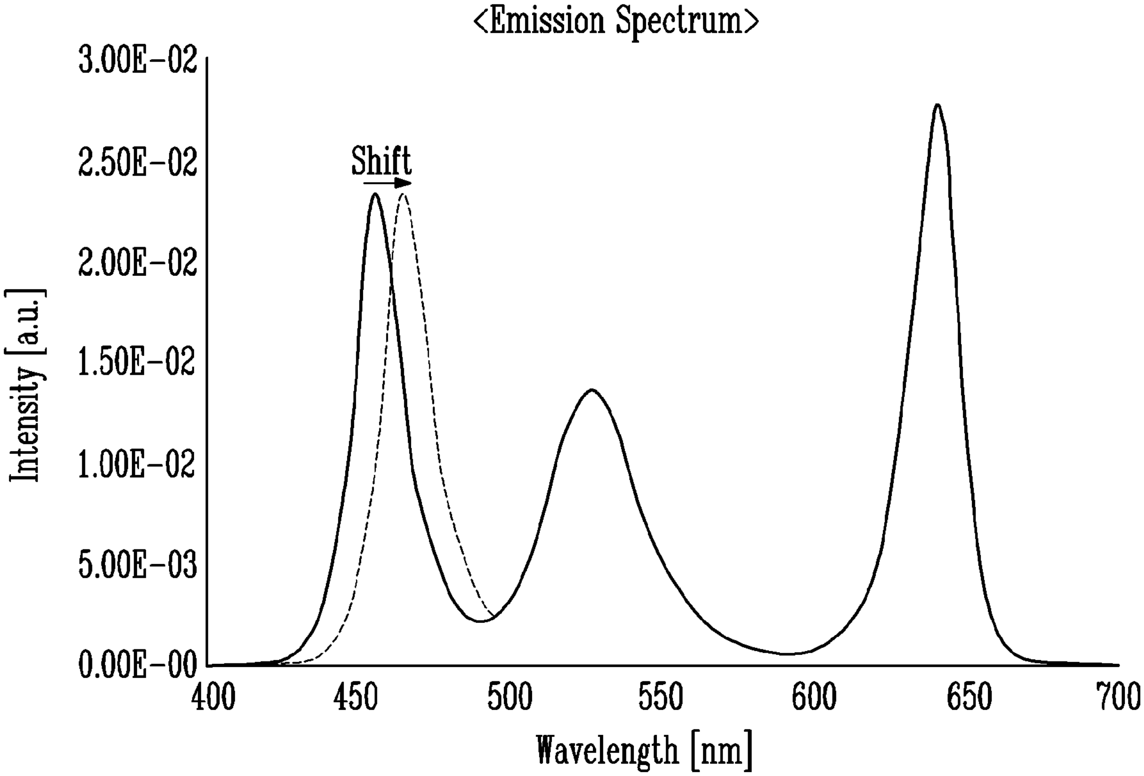
FIGS. 4A to 4D are schematic diagrams for explaining an example of an operation of a color difference detector included in the apparatus for correcting an image of FIG. 1.
Figure 4B:
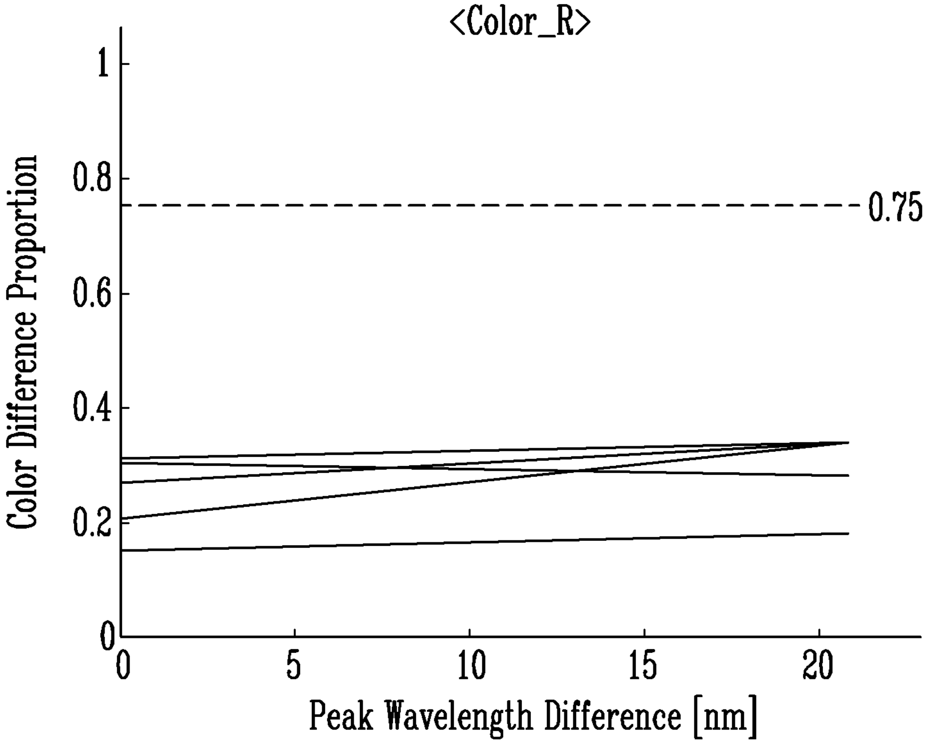
Figure 4C:
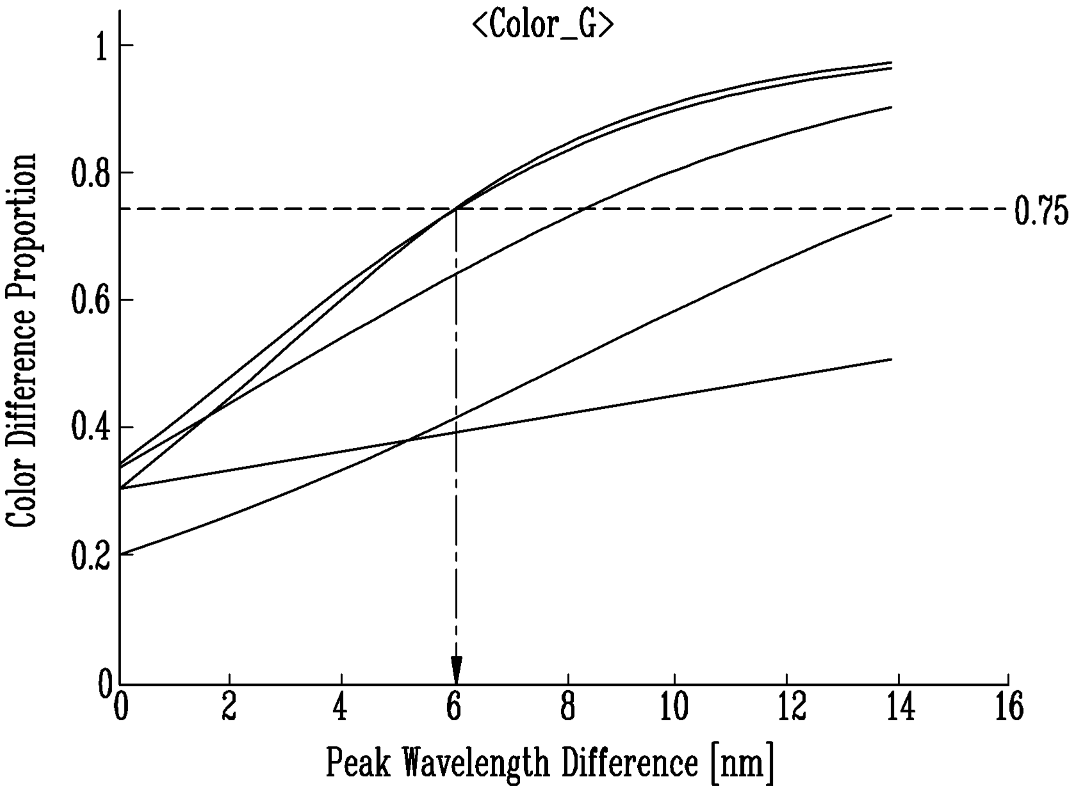
Figure 4D:
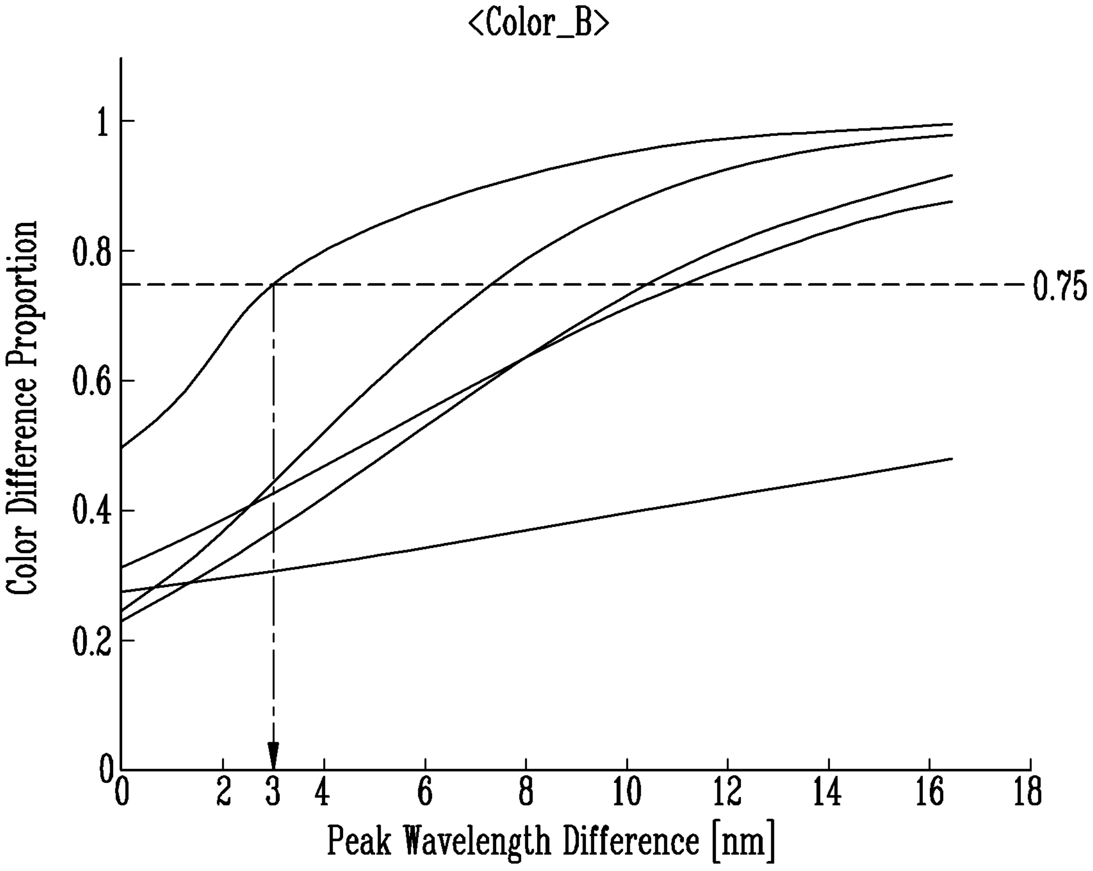

First, in order to describe an operation of the color difference detector 110 of the apparatus 100 for correcting an image, FIGS. 1, 3, and 4A to 4D may be referred to. Here, in case that the color difference detector 110 shifts the peak wavelength of one of the two color difference test images, FIG. 4A shows emission spectra corresponding to the color difference test images, and FIGS. 4B to 4D show a color difference proportion according to the peak wavelength difference.

Referring to FIGS. 1, 3, and 4A, the color difference detector 110 may display the two color difference test images (for example, the first color difference test image and the second color difference test image) on the reference display panels RDP1 and RDP2, respectively, and allow the user to compare and observe the color difference test images.

According to some embodiments, the color difference detector 110 may allow the user to compare and observe the color difference test images while changing the peak wavelength of one of the two color difference test images.

As described with reference to FIG. 1, the color difference detector 110 may allow the user to compare and observe the color difference test image while changing one of three peak wavelengths (for example, the blue peak wavelength, the green peak wavelength, and the red peak wavelength) of the color difference test image. For example, as shown in FIG. 4A, the color difference detector 110 may allow the user to compare and observe two color difference test images while changing the blue peak wavelength (or the first peak wavelength) generated near about 450 nm. Similarly, the color difference detector 110 may allow the user to compare and observe two color difference test images while changing the green peak wavelength (for example, the second peak wavelength) generated near about 530 nm. Similarly, the color difference detector 110 may allow the user to compare and observe two color difference test images while changing the red peak wavelength (for example, the third peak wavelength) generated near about 640 nm.

Thereafter, the color difference detector 110 may obtain the information on the critical peak wavelength shift corresponding to a point at which the user recognizes that the two color difference test images display different colors to obtain the color difference recognition information CDI.

Here, the critical peak wavelength shift may correspond to a peak wavelength difference of two color difference test images in which a color difference ratio of the two color difference test images may be equal to or greater than a critical color difference ratio. Here, the critical color difference ratio may be determined by experimentation or the like, and may mean a standard of color difference in which two color difference test images may be recognized by the user as displaying different colors. For example, the critical color difference ratio may be 0.75.

As described with reference to FIG. 1, even if the red peak wavelength among the three peak wavelengths is changed, the user may not recognize the color difference.

For example, as shown in FIG. 4B, in a case of red Color_R, even if the peak wavelength difference increases, the color difference ratio may be relatively small (for example, even if a red Color_R peak wavelength difference increases, the color difference ratio may be less than the critical color difference ratio). For example, even if a red Color_R peak wavelength is changed, the user may not recognize it as a color difference.

On the other hand, as shown in FIGS. 4C and 4D, in a case of green Color_G and blue Color_B, as the peak wavelength difference increases, the color difference ratio may increase to more than the critical color difference ratio. For example, in cases of green Color_G and blue Color_B, as the peak wavelength difference increases, the metamerism failure phenomenon described with reference to FIG. 1 may occur.

For example, as shown in FIG. 4C, in case that a green Color_G peak wavelength difference may be 6 nm or more, the color difference ratio may increase to more than the critical color difference ratio (for example, 0.75). Through this, the color difference detector 110 may obtain the first critical peak wavelength shift (for example, 6 nm in FIG. 4C) with respect to a green Color_G peak wavelength.

As another example, as shown in FIG. 4D, in case that a blue Color_B peak wavelength difference may be 3 nm or more, the color difference ratio may increase to more than the critical color difference ratio (for example, 0.75). Through this, the color difference detector 110 may obtain the second critical peak wavelength shift (for example, 3 nm in FIG. 4D) with respect to a blue Color_B peak wavelength.

The color difference detector 110 may obtain the color difference recognition information CDI based on the information on the critical peak wavelength shift (for example, information on the above-described first and second critical peak wavelength shift).

In order to describe an operation of the color correction data generator 120 of the apparatus 100 for correcting an image, FIGS. 1, 3, and 5 to 8 may be referred to. Here, FIG. 5 shows emission spectra SP1 and SP2 corresponding to color correction test images in case that the color correction data generator 120 sets two color correction test images to have a peak wavelength difference SPW equal to or greater than the critical peak wavelength shift. FIG. 6 shows color coordinates CI1 and CI2 of each of color correction test images whose color coordinates may be converted by the color correction data generator 120.

Referring to FIGS. 1, 3, and 5, the color difference detector 110 may display two color correction test images (for example, a first color correction test image and a second color correction test image) on the reference display panels RDP1 and RDP2, respectively, and allow the user to compare and observe the color correction test images.

As described with reference to FIG. 1, the color correction data generator 120 may display two color correction test images having a peak wavelength difference SPW equal to or greater than the critical peak wavelength shift on two display panels to be tested.

As described above, since the user may not recognize the color difference with respect to a change in the red Color_R peak wavelength (see FIG. 4B) among the peak wavelengths, the color correction data generator 120 may not perform comparison and observation with respect to the red Color_R peak wavelength (see FIG. 4B). For example, the color correction data generator 120 may allow the user to compare and observe the two color correction test images having the peak wavelength difference SPW equal to or greater than the critical peak wavelength shift only for the blue Color_B (see FIG. 4D) and green Color_G (see FIG. 4C).

For example, as shown in FIG. 5, with respect to the blue Color_B peak wavelength (see FIG. 4D), the color correction data generator 120 may set the peak wavelength difference SPW of the two color correction test images to be equal to or greater than the critical peak wavelength (for example, the second critical peak wavelength as described with reference to FIG. 4D), and allow the user to compare and observe the color correction test images.

Similarly, with respect to the green Color_G peak wavelength (see FIG. 4C), the color correction data generator 120 may set the peak wavelength difference SPW of the two color correction test images to be equal to or greater than the critical peak wavelength (for example, the first critical peak wavelength as described with reference to FIG. 4C), and allow the user to compare and observe the color correction test images.

As described with reference to FIG. 1, in setting the peak wavelength difference of the two color correction test images, the color correction data generator 120 may allow the user to compare and observe the color correction test images while setting not only one peak wavelength but also two or more peak wavelengths to be greater than or equal to the critical peak wavelength shift. For example, the color correction data generator 120 may allow the user to compare and observe the two color correction test images while setting the green Color_G peak wavelength (see FIG. 4C) to be equal to or greater than the first critical peak wavelength and simultaneously setting the blue Color_B peak wavelength (see FIG. 4D) to be equal to or greater than the second critical peak wavelength.

As described with reference to FIG. 1, the color correction data generator 120 may allow the user to compare and observe the color correction test images while fixing the first color coordinates of the first color correction test image among the two color correction test images and changing the second color coordinates of the second color correction test image, and obtain information on the color coordinates that can be recognized by the user as the color correction test images displaying the same color.

For example, as shown in FIG. 6, as the second color coordinates CI2 of the second color correction test image may be transformed by the color correction data generator 120, the first color coordinates CI1 and the second color coordinates CI2 may have different values. The two color correction test images may have different color coordinates CI1 and CI2, but may be recognized by the user as the same color due to the peak wavelength difference.

According to some embodiments, the color correction data generator 120 may generate the color correction data CCD based on information on the transformed color coordinates so that the user can recognize the color correction test images as the same color.

In an embodiment, the color correction data generator 120 may generate the color correction data CCD by calculating a color correction matrix.

For example, as shown in FIGS. 7A and 7B, the color correction data generator 120 may calculate a color correction matrix M for converting color coordinate values (or tristimulus values) (shown as "XYZ" in FIGS. 7A and 7B) corresponding to the first color coordinates CI1 of the first color correction test image to which the color coordinates may be fixed into color coordinate values (or tristimulus values) (shown as "X'Y'Z'" in FIGS. 7A and 7B) corresponding to the second color coordinates CI2 of the second color correction test image from which the color coordinates may be converted. For example, the color correction data generator 120 may calculate the color correction matrix M through least squares regression. Since each of the color coordinates CI1 and CI2 have three color coordinate values, as shown in FIG. 7B, the color correction matrix M for converting the color coordinates may be a 3×3 matrix including nine components ($\sigma 11$ to $\sigma 33$).

As described with reference to FIG. 1, in setting the peak wavelength difference of two color correction test images, for a case where a peak wavelength (for example, the green peak wavelength or the blue peak wavelength) may be set to be equal to or greater than the critical peak wavelength shift as well as a case where two peak wavelengths (for example, the green peak wavelength and the blue peak wavelength) may be set to be equal to or greater than the critical peak wavelength shift, the color correction data generator 120 may allow the user to compare and observe the color correction test images.

Accordingly, as shown in FIG. 8, for both a case where a green peak wavelength difference DPW1 may be set to be equal to or greater than the first critical peak wavelength (for example, 6 nm) and a case where a blue peak wavelength difference DPW2 may be set to be equal to or greater than the second critical peak wavelength (for example, 3 nm), the color correction data generator 120 may allow the user to compare and observe the color correction test images, and may calculate color correction matrices M01 to Mij for each case. According to some embodiments, the color correction data generator 120 may generate the color correction data CCD in the form of a lookup table LUT including the calculated color correction matrices M01 to Mij.

In order to describe an operation of the image correction data generator 130 of the apparatus 100 for correcting an image, FIGS. 1 to 3 and FIGS. 9A to 10B may be referred to. Here, FIG. 9A is a first graph Graph1 showing luminance for each grayscale and a peak wavelength difference with respect to a green (or first color) image of a display device to be corrected (for example, the display device 200 of FIG. 12). FIG. 9B is a second graph Graph2 showing luminance for each grayscale and a peak wavelength difference with respect to a blue (or second color) image of a display device to be corrected (for example, the display device 200 of FIG. 12). FIG. 10A shows color coordinates of an image whose color coordinates may not be corrected. FIG. 10B shows color coordinates of an image whose color coordinates have been corrected by the apparatus 100 for correcting an image according to embodiments of the disclosure.

Referring to FIGS. 1 to 3, 8, 9A, and 9B, the image correction data generator 130 (or the spectrum detector 131) may generate the spectrum data SD by detecting the emission spectrum of an image displayed by the display device (for example, the display device 200 of FIG. 12).

For example, the spectrum detector 131 may detect the emission spectrum of the green (or first color) image displayed by the display device. According to some embodiments, the spectrum detector 131 may detect the emission spectrum of the green image for each grayscale while changing the grayscale of the green image.

As another example, the spectrum detector 131 may detect the emission spectrum of the blue (or second color) image displayed by the display device. According to some embodiments, the spectrum detector 131 may detect the emission spectrum of the blue image for each grayscale while changing the grayscale of the blue image.

The image correction data generator 130 (or the peak wavelength detector 132) may generate the peak wavelength data PWD by detecting the difference between the peak wavelength on the emission spectrum for each grayscale and the reference peak wavelength based on the spectrum data SD and the color difference recognition information CDI.

In an embodiment, the peak wavelength detector 132 may set the emission spectrum corresponding to the highest grayscale (for example, 255 grayscale) among emission spectra of the image measured for each grayscale as the reference spectrum, and may detect the peak wavelength difference of the image displayed by the display device by comparing the reference peak wavelength on the reference spectrum with the peak wavelengths of the emission spectra corresponding to the remaining grayscales, respectively.

For example, the peak wavelength detector 132 may detect the peak wavelength difference by comparing the reference peak wavelength of the highest grayscale (for example, 255 grayscale (255 G)) with a peak wavelength of each of the remaining grayscales (for example, 0 grayscale to 254 grayscale) with respect to the green image. For example, as shown in FIG. 9A, the peak wavelength detector 132 may detect a first peak wavelength difference PWD1 (for example, 6 nm) from 220 grayscale (220 G) to 254 grayscale, detect a second peak wavelength difference PWD2 (for example, 12 nm) from 160 grayscale (160 G) to 219 grayscale, and detect a third peak wavelength difference PWD3 (for example, 18 nm) from 0 grayscale to 159 grayscale.

As another example, the peak wavelength detector 132 may detect the peak wavelength difference by comparing the reference peak wavelength of the highest grayscale (for example, 255 grayscale (255 G)) with the peak wavelength of each of the remaining grayscales (for example, 0 grayscale to 254 grayscale) with respect to the blue image. For example, as shown in FIG. 9B, the peak wavelength detector 132 may detect a fourth peak wavelength difference PWD4 (for example, 3 nm) from 220 grayscale (220 G) to 254 grayscale, detect a fifth peak wavelength difference PWD5 (for example, 6 nm) from 160 grayscale (160 G) to 219 grayscale, and detect a sixth peak wavelength difference PWD6 (for example, 9 nm) from 0 grayscale to 159 grayscale.

The color converter 133 may generate the image correction data ICDAT based on the peak wavelength data PWD and the color correction data CCD.

For example, the color converter 133 may detect a peak wavelength difference of a green grayscale and a peak wavelength difference of a blue grayscale using the peak wavelength data PWD for a specific image, and convert the color coordinates of a corresponding image based on the color correction data CCD.

For example, in a case of an image in which a red grayscale may be 200 grayscale, the green grayscale may be 230 grayscale, and the blue grayscale may be 180 grayscale, the green peak wavelength difference DPW1 with respect to the green grayscale may have the first peak wavelength difference PWD1 (for example, 6 nm), and the blue peak wavelength difference DPW2 with respect to the blue grayscale may have the fifth peak wavelength difference PWD5 (for example, 6 nm). Accordingly, the color converter 133 may match a corresponding color correction matrix M21 among the color correction matrices M01 to Mij included in the color correction data CCD with respect to the corresponding image.

Similarly, in a case of an image in which the red grayscale may be 120 grayscale, the green grayscale may be 180 grayscale, and the blue grayscale may be 255 grayscale, the green peak wavelength difference DPW1 with respect to the green grayscale may have the second peak wavelength difference PWD2 (for example, 12 nm), and the blue peak wavelength difference DPW2 with respect to the blue grayscale may have a value of 0 nm. Accordingly, the color converter 133 may match a corresponding color correction matrix M02 among the color correction matrices M01 to Mij included in the color correction data CCD with respect to the corresponding image.

As such, the color converter 133 may generate the image correction data ICDAT by matching the color correction matrix of each image with respect to the green and blue grayscales of images displayed by the display device.

The display device may display the corrected image in which the color coordinates of the image to be displayed may be converted based on the image correction data ICDAT. For example, as shown in FIGS. 10A and 10B, in a case of an image whose color coordinates may not be corrected, color coordinate values Cx and Cy for each grayscale may be substantially the same except for the low grayscale. However, in a case of the corrected image in which the color coordinates of the image to be displayed may be converted based on the image correction data ICDAT, the color coordinate values Cx and Cy for each grayscale may have different values depending on the grayscale. Since the image correction data ICDAT may be generated based on the information on the color coordinates in which two images having a specific peak wavelength difference may be recognized as the same by the user, in the case of the corrected image in which the color coordinates may be converted, even if the color coordinate values Cx and Cy for each grayscale may be different, the user may recognize that the images for each grayscale express the same color.

Figure 11:
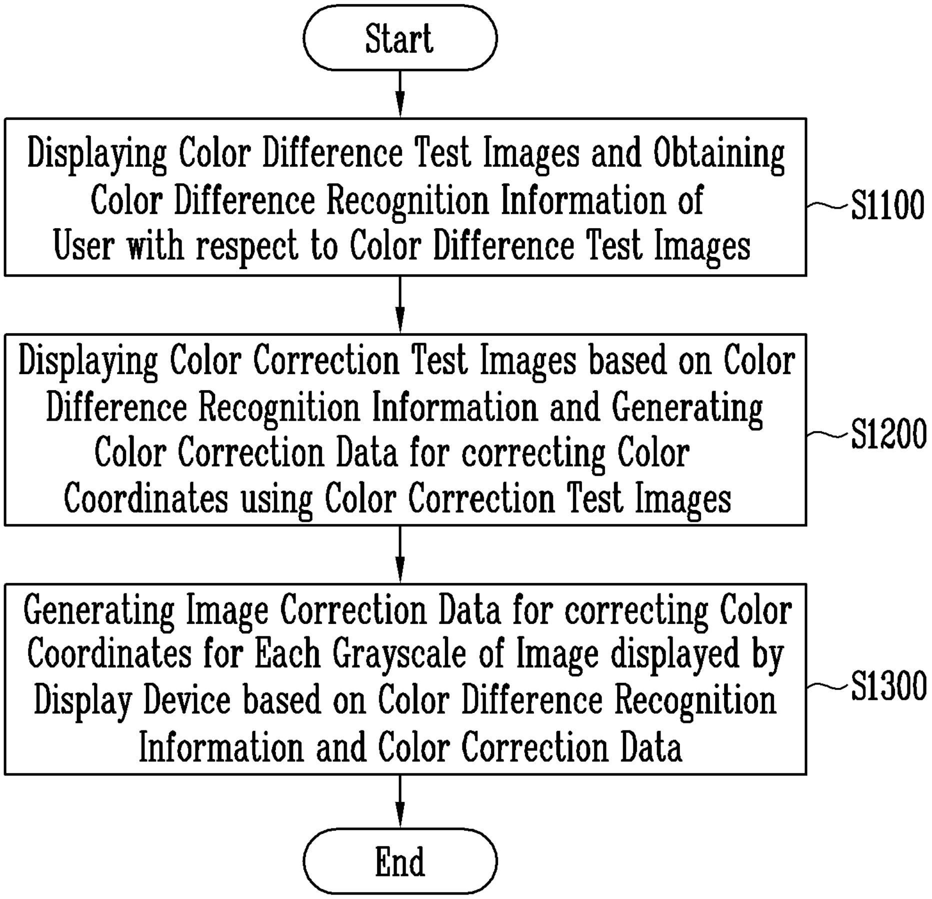
FIG. 11 is a flowchart illustrating a method of correcting an image according to embodiments of the disclosure.

FIG. 11 is a flowchart illustrating a method of correcting an image according to embodiments of the disclosure. Since the method for correcting an image of FIG. 11 may be performed using the apparatus 100 for correcting an image of FIG. 1, hereinafter, descriptions that overlap with those with reference to FIGS. 1 to 10B will be omitted.

Referring to FIG. 11, the method for correcting an image of FIG. 11 may include displaying color difference test images and obtaining color difference recognition information of a user with respect to the color difference test images (S1100), displaying color correction test images based on the color difference recognition information and generating color correction data for correcting color coordinates using the color correction test images (S1200), and generating image correction data for correcting color coordinates for each grayscale of the image displayed by the display device based on the color difference recognition information and the color correction data (S1300).

In the obtaining the color difference recognition information (S1100), the color difference detector 110 described with reference to FIGS. 1, 3, and 4A to 4D may generate the color difference recognition information CDI.

In the generating the color correction data (S1200), the color correction data generator 120 described with reference to FIGS. 1, 3, and 5 to 8 may generate the color correction data CCD.

In the generating the image correction data (S1300), the image correction data generator 130 described with reference to FIGS. 1, 2, 3, and 9A to 10B may generate the image correction data ICDAT.

FIG. 12 is a schematic block diagram illustrating an image correction system including a display device and an apparatus for correcting an image according to embodiments of the disclosure.

Referring to FIGS. 1 and 12, an image correction system may include an apparatus 100 for correcting an image and a display device 200. Here, since the apparatus 100 for correcting an image may be substantially the same as the apparatus 100 for correcting an image described with reference to FIGS. 1 to 10B, duplicate descriptions thereof will be omitted.

The display device 200 may include a pixel unit 210 (or a display panel), a memory 220, a timing controller 230, a scan driver 240, and a data driver 250.

The pixel unit 210 may include scan lines SL1 to SLn, data lines DL1 to DLm, and pixels PX, where n and m may be integers greater than 0.

The pixels PX may be electrically connected to at least one of the scan lines SL1 to SLn and at least one of the data lines DL1 to DLm. Each of the pixels PX may emit light with a luminance corresponding to a data signal provided through a corresponding data line in response to a scan signal provided through a corresponding scan line. The pixels PX may receive voltages of a first power source VDD and a second power source VSS from outside. Here, the first power source VDD and the second power source VSS may be voltages necessary for the operation of the pixels PX. For example, the first power source VDD may have a voltage level higher than a voltage level of the second power source VSS.

The memory 220 may store the image correction data ICDAT generated by the apparatus 100 for correcting an image, and provide the image correction data ICDAT to the timing controller 230.

The timing controller 230 may receive a control signal CS and input image data IDATA from the outside (for example, a processor). Here, the control signal CS may include a clock signal, a vertical synchronization signal, a horizontal synchronization signal, and the like.

The timing controller 230 may generate a first control signal SCS and a second control signal DCS based on the control signal CS. The first control signal SCS may be provided to the scan driver 240, and the second control signal DCS may be provided to the data driver 250.

The timing controller 230 may correct color coordinates of the input image data IDATA based on the image correction data ICDAT, and generate image data DATA based on the input image data IDATA whose color coordinates may be corrected. The image data DATA may be provided to the data driver 250.

In FIG. 12, the memory 220 is shown as being included in the display device 200, but this is an example and embodiments of the disclosure are not limited thereto. For example, the memory 220 may be formed outside the display device, and the display device 200 (or the timing controller 230) may receive the image correction data ICDAT from the outside to correct the color coordinates of the input image data IDATA.

The scan driver 240 may receive the first control signal SCS from the timing controller 230 and supply scan signals to the scan lines SL1 to SLn based on the first control signal SCS. For example, the scan signals may be sequentially supplied to the scan lines SL1 to SLn.

The data driver 250 may generate data signals based on the image data DATA and the second control signal DCS, and may supply the data signals to the data lines DL1 to DLm.

The image data DATA provided from the timing controller 230 may be generated by correcting the color coordinates based on the image correction data ICDAT. Therefore, a user may recognize that images displayed on the pixel unit 210 according to the data signal may be expressed in the same color for each grayscale. Accordingly, the metamerism failure phenomenon (or the color difference recognition phenomenon) can be prevented (or improved).

Figure 13:
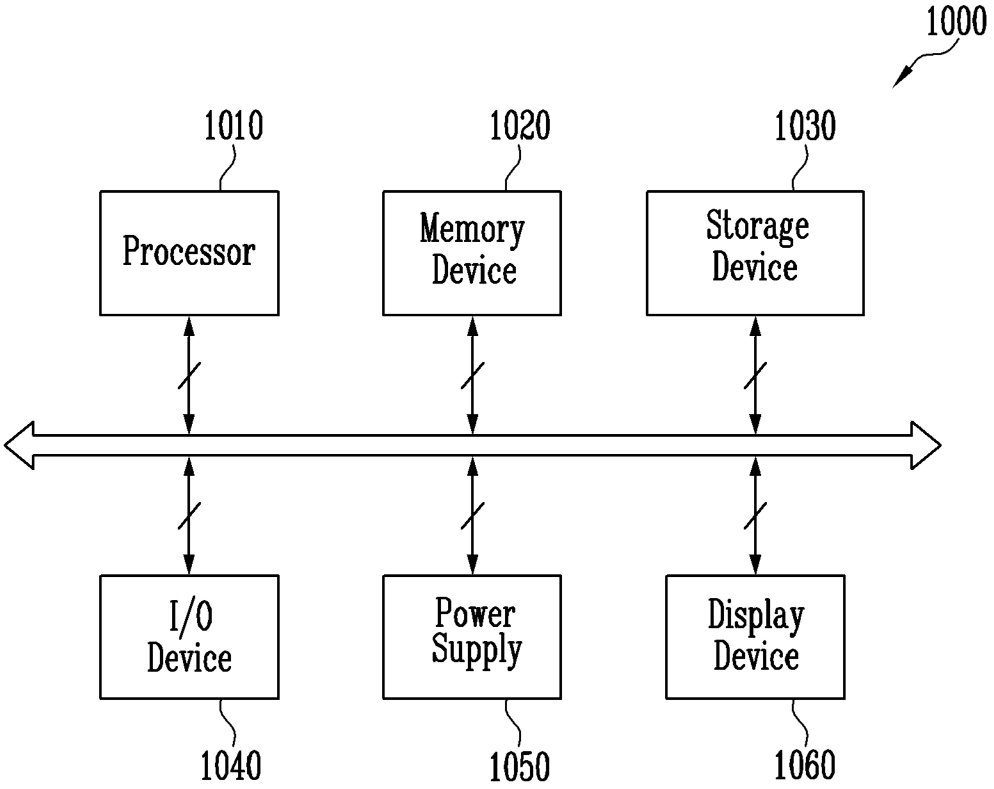
FIG. 13 is a schematic block diagram illustrating an electronic device according to embodiments of the disclosure.

FIG. 13 is a schematic block diagram illustrating an electronic device according to embodiments of the disclosure.

Referring to FIG. 13, an electronic device 1000 may include a processor 1010, a memory device 1020, a storage device 1030, an input/output device 1040, a power supply 1050, and a display device 1060.

The electronic device 1000 may be implemented as various types of devices having a display function, including the display device 1060. Here, the display device 1060 may correspond to the display device 200 described with reference to FIG. 12.

In an embodiment, the electronic device 1000 may include at least one of smartphones, tablet personal computers (PC), mobile phones, video phones, e-book readers, desktop personal computers (PC), laptop personal computers (PC), netbook computers, workstations, servers, personal digital assistants (PDA), portable multimedia players (PMP), MP3 players, mobile medical devices, cameras, or wearable devices (for example, smart glasses, head-mounted-devices (HMD), electronic apparel, electronic bracelets, electronic necklaces, electronic accessories, electronic tattoos, smart mirrors, and smart watches).

In some embodiments, the electronic device 1000 may be a smart home appliance. The smart home appliance may include, for example, at least one of televisions, digital video disk (DVD) players, audio devices, refrigerators, air conditioners, vacuum cleaners, ovens, microwave ovens, washing machines, air purifiers, set-top boxes, home automation control panels, security control panels, TV boxes (for example, Samsung HomeSync™, AppleTV™, or Google TV™), game consoles (for example, Xbox™ or PlayStation™), electronics dictionaries, electronic keys, camcorders, and electronic picture frames.

In another embodiment, the electronic device 1000 may include at least one of various medical devices (for example, various portable medical measuring devices (blood glucose meter, heart rate monitor, blood pressure monitor, body temperature monitor, etc.), magnetic resonance angiography (MRA), magnetic resonance imaging (MRI), computed tomography (CT), camera, ultrasound machine, etc.), navigation devices, global positioning system receivers, event data recorders (EDR), flight data recorders (FDR), automotive infotainment devices, electronic equipment for ships (for example, navigation devices for ships, gyro compasses, etc.), avionics, security devices, head units for vehicles, industrial or household robots, automatic teller machines (ATM) in financial institutions, point of sale (POS) devices, and internet of things devices (for example, light bulbs, sensors, electricity or gas meters, sprinkler devices, smoke alarms, thermostats, street lights, toasters, exercise equipment, hot water tanks, heaters, boilers, etc.).

According to some embodiments, the electronic device 1000 may include at least one of a part of a piece of furniture or building/structure, an electronic board, an electronic signature receiving device, a projector, and various measuring devices (for example, water, electricity, gas, radio wave measuring device, etc.). In various embodiments, the electronic device 1000 may be a combination of one or more of the various devices described above. The electronic device 1000 according to an embodiment may be a flexible electronic device. The electronic device 1000 according to an embodiment of the disclosure is not limited to the above-described devices, and may include new electronic devices according to technological development.

The processor 1010 may control other components included in the electronic device 1000 and may perform various data processing and operations. For example, the processor 1010 may supply data corresponding to an image to the display device 1060. According to an embodiment, the processor 1010 may be a microprocessor, a central processing unit, an application processor, or the like.

The memory device 1020 may store data necessary for an operation of the electronic device 1000. For example, the memory device 1020 may include at least one of a non-volatile memory device such as an Erasable Programmable Read-Only Memory (EPROM) device, an Electrically Erasable Programmable Read-Only Memory (EEPROM) device, a flash memory device, a Phase Change Random Access Memory (PRAM) device, a Resistance Random Access Memory (RRAM) device, a Nano Floating Gate Memory (NFGM) device, a Polymer Random Access Memory (PoRAM) device, a Magnetic Random Access Memory (MRAM) device, a Ferroelectric Random Access Memory (FRAM) device, etc. and/or a volatile memory device such as a Dynamic Random Access Memory (DRAM) device, a Static Random Access Memory (SRAM) device, a mobile DRAM device, etc.

As described with reference to FIG. 12, in an embodiment in which the memory 220 may be formed outside the display device to provide the image correction data ICDAT to the display device, the memory device 1020 of FIG. 13 may correspond to the memory 220 of FIG. 12.

The storage device 1030 may include at least one of a solid state drive (SSD), a hard disk drive (HDD), a CD-ROM, and the like. Software used in the electronic device 1000 may be stored in the storage device 1030. For example, the storage device 1030 may store an operating system, middleware, applications, and the like.

The input/output device 1040 may receive a command or data to be used in the electronic device 1000 from outside of the electronic device 1000. To this end, the input/output device 1040 may include at least one of a keyboard, a microphone, a mouse, a touch pad, a touch screen, a remote control, a camera (recognizing user's motion), and the like. The input/output device 1040 may output a sound signal to the outside of the electronic device 1000 using a speaker or the like.

The power supply 1050 may supply a power source required for the operation of the electronic device 1000.

The display device 1060 may visually provide information to the user of the electronic device 1000. The display device 1060 may include a touch screen to recognize a touch input from the user.

The apparatus and method for correcting an image according to embodiments of the disclosure may correct color coordinates of an image to be displayed according to the cognitive ability of a user (observer). Accordingly, the metamerism failure phenomenon (or color difference recognition phenomenon) in which the color of an image may be recognized differently by the user according to a grayscale can be prevented (or improved).

However, effects of the disclosure are not limited to the above-described effects, and may be variously extended without departing from the spirit and scope of the disclosure.

As described above, embodiments of the disclosure have been described with reference to the drawings. However, those skilled in the art will appreciate that various modifications and changes can be made to the disclosure without departing from the spirit and scope of the disclosure.

What is claimed is:

1. An apparatus for correcting an image of a display device comprising:

a color difference detector displaying at least two color difference test images and obtaining color difference recognition information of a user with respect to the at least two color difference test images;

a color correction data generator displaying color correction test images based on the color difference recognition information and generating color correction data for correcting color coordinates using the color correction test images; and an image correction data generator generating image correction data for correcting color coordinates for each grayscale of the image displayed by the display device based on the color difference recognition information and the color correction data and including a spectrum detector generating spectrum data by detecting an emission spectrum of an image for each grayscale while changing a grayscale of the image displayed by the display device.

2. The apparatus of claim 1, wherein the at least two color difference test images have same color coordinates, and the at least two color difference test images have different peak wavelengths.

3. The apparatus of claim 2, wherein the color difference detector obtains the color difference recognition information by detecting a critical peak wavelength shift based on a peak wavelength difference of the at least two color difference test images.

4. The apparatus of claim 3, wherein the at least two color difference test images having the peak wavelength difference corresponding to the critical peak wavelength shift display different colors.

5. The apparatus of claim 3, wherein the color correction test images include:

a first color correction test image; and a second color correction test image, and a peak wavelength difference of the first color correction test image and the second color correction test image is equal to or greater than the critical peak wavelength shift.

6. The apparatus of claim 5, wherein the color correction data generator detects first color coordinates of the first color correction test image and second color coordinates of the second color correction test image, and the first color coordinates and the second color coordinates are different from each other.

7. The apparatus of claim 6, wherein the first color correction test image having the first color coordinates and the second color correction test image having the second color coordinates display a same color.

8. The apparatus of claim 6, wherein the color correction data generator generates the color correction data by calculating a color correction matrix for converting the first color coordinates into the second color coordinates.

9. The apparatus of claim 8, wherein the color correction matrix is stored in a form of a look-up table (LUT) in the color correction data.

10. The apparatus of claim 1, wherein the image correction data generator further includes:

a peak wavelength detector generating peak wavelength data by detecting a difference between a peak wavelength for each grayscale and a reference peak wavelength based on the spectrum data and the color difference recognition information; and a color converter generating the image correction data for correcting the color coordinates for each grayscale of the image displayed by the display device based on the peak wavelength data and the color correction data.

11. A method for correcting an image of a display device comprising:

displaying at least two color difference test images and obtaining color difference recognition information of a user with respect to the at least two color difference test images;

displaying color correction test images based on the color difference recognition information and generating color correction data for correcting color coordinates using the color correction test images; and generating image correction data for correcting color coordinates for each grayscale of the image displayed by the display device based on the color difference recognition information and the color correction data including generating spectrum data by detecting an emission spectrum of an image for each grayscale while changing a grayscale of the image displayed by the display device.

12. The method of claim 11, wherein the at least two color difference test images have same color coordinates, and the at least two color difference test images have different peak wavelengths.

13. The method of claim 12, wherein in the obtaining of the color difference recognition information, the color difference recognition information is obtained by detecting a critical peak wavelength shift based on a peak wavelength difference of the at least two color difference test images.

14. The method of claim 13, wherein the at least two color difference test images having the peak wavelength difference corresponding to the critical peak wavelength shift display different colors.

15. The method of claim 13, wherein the color correction test images:

include a first color correction test image; and a second color correction test image, and a peak wavelength difference of the first color correction test image and the second color correction test image is equal to or greater than the critical peak wavelength shift.

16. The method of claim 15, wherein the generating of the color correction data includes detecting first color coordinates of the first color correction test image and second color coordinates of the second color correction test image, and the first color coordinates and the second color coordinates are different from each other.

17. The method of claim 16, wherein the first color correction test image having the first color coordinates and the second color correction test image having the second color coordinates display a same color.

18. The method of claim 16, wherein the generating of the color correction data further includes calculating a color correction matrix for converting the first color coordinates into the second color coordinates.

19. The method of claim 18, wherein the color correction matrix is stored in a form of a look-up table (LUT) in the color correction data.

20. The method of claim 11, wherein the generating of the image correction data further includes:

generating peak wavelength data by detecting a difference between a peak wavelength for each grayscale and a reference peak wavelength based on the spectrum data and the color difference recognition information; and generating the image correction data for correcting the color coordinates for each grayscale of the image displayed by the display device based on the peak wavelength data and the color correction data.

* * * * *